US008612958B2

(12) United States Patent
Heishi et al.

(10) Patent No.: US 8,612,958 B2
(45) Date of Patent: Dec. 17, 2013

(54) PROGRAM CONVERTING APPARATUS AND PROGRAM CONVERSION METHOD

(75) Inventors: Taketo Heishi, Osaka (JP); Shohei Michimoto, Osaka (JP); Teruo Kawabata, Osaka (JP)

(73) Assignee: Panasonic Corporation, Osaka (JP)

(*) Notice: Subject to any disclaimer, the term of this patent is extended or adjusted under 35 U.S.C. 154(b) by 182 days.

(21) Appl. No.: 13/163,035

(22) Filed: Jun. 17, 2011

(65) Prior Publication Data

US 2011/0252410 A1 Oct. 13, 2011

Related U.S. Application Data

(63) Continuation of application No. PCT/JP2009/005870, filed on Nov. 5, 2009.

(30) Foreign Application Priority Data

Dec. 25, 2008 (JP) .................................. 2008-331632

(51) Int. Cl.
*G06F 9/45* (2006.01)

(52) U.S. Cl.
USPC ........................... 717/161; 717/146; 717/159

(58) Field of Classification Search
None
See application file for complete search history.

(56) References Cited

U.S. PATENT DOCUMENTS

| | | | | | |
|---|---|---|---|---|---|
| 5,127,092 | A | * | 6/1992 | Gupta et al. .................. 712/234 |
| 5,560,028 | A | * | 9/1996 | Sachs et al. ..................... 712/23 |
| 5,692,139 | A | * | 11/1997 | Slavenburg et al. .......... 710/316 |
| 5,790,845 | A | * | 8/1998 | Shimada et al. ............... 712/238 |
| 5,835,776 | A | * | 11/1998 | Tirumalai et al. ............. 717/161 |
| 5,872,990 | A | * | 2/1999 | Luick et al. ...................... 712/24 |
| 5,941,983 | A | * | 8/1999 | Gupta et al. ................... 712/214 |
| 5,950,007 | A | * | 9/1999 | Nishiyama et al. ........... 717/161 |
| 5,966,534 | A | * | 10/1999 | Cooke et al. ................... 717/159 |
| 5,966,537 | A | * | 10/1999 | Ravichandran ............... 717/158 |
| 5,978,588 | A | * | 11/1999 | Wallace ......................... 717/159 |
| 6,021,275 | A | * | 2/2000 | Horwat .......................... 717/159 |

(Continued)

FOREIGN PATENT DOCUMENTS

| | | |
|---|---|---|
| JP | 06-59908 | 3/1994 |
| JP | 60-59908 | 3/1994 |

(Continued)

OTHER PUBLICATIONS

"Define: Programmer", Google , Feb. 20, 2013 , <https://www.google.com/search?q=define%3A+programmer&sourceid=ie7&rls=com.microsoft:en-us:IE-SearchBox&ie=&oe=> , 1 page.*

(Continued)

*Primary Examiner* — Thuy Dao
*Assistant Examiner* — Samuel Hayim
(74) *Attorney, Agent, or Firm* — McDermott Will & Emery LLP

(57) ABSTRACT

A compiler, which corresponds to a recent processor having a multithread function, that enables execution of efficient instruction scheduling and allows a programmer to control the instruction scheduling includes: an instruction scheduling directive receiving unit which receives, from a programmer, a directive for specifying an instruction scheduling method; and an instruction scheduling unit which executes, conforming to one of instruction scheduling methods, instruction scheduling of rearranging intermediate codes corresponding to the source program. The instruction scheduling unit selects one of instruction scheduling methods according to the directive received by the instruction scheduling directive receiving unit, and executes instruction scheduling conforming to the selected instruction scheduling method.

5 Claims, 7 Drawing Sheets

(56) References Cited

U.S. PATENT DOCUMENTS

| | | | |
|---|---|---|---|
| 6,026,240 A * | 2/2000 | Subramanian | 717/161 |
| 6,038,396 A * | 3/2000 | Iwata et al. | 717/161 |
| 6,044,222 A * | 3/2000 | Simons et al. | 717/156 |
| 6,102,969 A * | 8/2000 | Christianson et al. | 717/146 |
| 6,112,299 A * | 8/2000 | Ebcioglu et al. | 712/236 |
| 6,192,515 B1 * | 2/2001 | Doshi et al. | 717/161 |
| 6,230,317 B1 * | 5/2001 | Wu | 717/161 |
| 6,233,732 B1 * | 5/2001 | Matsuyama et al. | 717/146 |
| 6,363,475 B1 * | 3/2002 | Dowling | 712/206 |
| 6,385,757 B1 * | 5/2002 | Gupta et al. | 716/102 |
| 6,629,312 B1 * | 9/2003 | Gupta | 717/136 |
| 6,718,544 B1 | 4/2004 | Humphreys et al. | |
| 7,313,787 B2 | 12/2007 | Motokawa et al. | |
| 2001/0018764 A1 * | 8/2001 | Davis et al. | 717/146 |
| 2001/0032332 A1 | 10/2001 | Ward et al. | |
| 2002/0019973 A1 * | 2/2002 | Hayashida | 717/106 |
| 2002/0147760 A1 * | 10/2002 | Torii | 709/107 |
| 2003/0056088 A1 * | 3/2003 | Heishi et al. | 712/214 |
| 2003/0066060 A1 * | 4/2003 | Ford | 717/158 |
| 2003/0140334 A1 * | 7/2003 | Granston et al. | 717/125 |
| 2004/0010782 A1 * | 1/2004 | Moritz | 717/151 |
| 2004/0078791 A1 * | 4/2004 | Metzger | 717/161 |
| 2004/0098713 A1 | 5/2004 | Ogawa et al. | |
| 2004/0154006 A1 | 8/2004 | Heishi et al. | |
| 2004/0199907 A1 | 10/2004 | Motokawa et al. | |
| 2004/0268327 A1 * | 12/2004 | Burger | 717/140 |
| 2005/0015781 A1 * | 1/2005 | Brown et al. | 719/331 |
| 2005/0039167 A1 * | 2/2005 | Fernandes et al. | 717/116 |
| 2005/0086653 A1 | 4/2005 | Heishi et al. | |
| 2005/0102560 A1 | 5/2005 | Taketoshi et al. | |
| 2005/0182916 A1 * | 8/2005 | Kageyama et al. | 712/24 |
| 2010/0175056 A1 | 7/2010 | Ogawa et al. | |

FOREIGN PATENT DOCUMENTS

| | | |
|---|---|---|
| JP | 2001-159983 | 6/2001 |
| JP | 2001-243077 | 9/2001 |
| JP | 3311381 | 5/2002 |
| JP | 2004-38597 | 2/2004 |
| JP | 2004-234126 | 8/2004 |
| JP | 2004303113 A | 10/2004 |
| JP | 2005-122506 | 5/2005 |
| JP | 2005-128937 | 5/2005 |
| JP | 2006-268070 | 10/2006 |

OTHER PUBLICATIONS

Sujay Parekh et al., "Thread-Sensitive Scheduling for SMT Processors", University of Washington, 2000, <ftp://ftp.cs.washington.edu/tr/2000/04/UW-CSE-00-04-02.pdf>, pp. 1-18.*

Adi Yoaz et al., "Speculation Techniques for Improving Load Related Instruction Scheduling", ACM, 1999, <http://ieeexplore.ieee.org/stamp/stamp.jsp?tp=&arnumber=765938>, pp. 1-12.*

Daniel Kerns et al., "Balanced Scheduling: Instruction Scheduling When Memory Latency is Uncertain", ACM, 2003, <http://delivery.acm.org/10.1145/990000/989444/p515-kerns.pdf>, pp. 1-13.*

"Configuration of a superscalar processor and its performance evaluation", with Partial English Translation thereof, Mitsuo Saito, Atsushi Inoue, Kenji Takeda, Information Processing Society of Japan, vol. 92, No. 48, pp. 2-5, No. 92-ARC-94-11 Published on Jun. 12, 1992.

"Program Development Environment for SX-8", with Partial English Translation thereof, Yuji Yokoya, Yoshihiro Kudoh, Masanori Tamura, Yasuharu Hayashi, Yoshiaki Hirotani, NEC Technical Journal vol. 58 No. 4 pp. 48-49, Published on Jul. 25, 2005.

* cited by examiner

FIG. 7

| Multithread operation mode | Instruction level parallelism | Instruction latency ratio |
|---|---|---|
| 1 | 4 | 1 |
| 2 | 4 | 2 |
| 3 | 4 | 3 |
| 4 | 2 | 1 |

PROGRAM CONVERTING APPARATUS AND PROGRAM CONVERSION METHOD

CROSS REFERENCE TO RELATED APPLICATION(S)

This is a continuation application of PCT application No. PCT/JP2009/005870 filed on Nov. 5, 2009, designating the United States of America.

BACKGROUND OF THE INVENTION (1) Field of the Invention

The present invention relates to program converting apparatuses which convert source programs written in a high-level language such as C language into machine language programs, and particularly relates to program converting apparatuses which perform instruction scheduling suitable to processors having a parallel processing mechanism.

(2) Description of the Related Art

In an instruction set included in a processor, latency, which is the number of cycles required to execute one instruction, usually varies depending on the instruction. Thus, even with the same instruction sequence, waiting time before an initiation of instruction execution varies depending on the order of execution. As a result, the number of execution cycles in total can be different. Specifically, the number of execution cycles in total is smaller when longer waiting time of instructions having long latency is successfully concealed with execution of other instructions.

In view of the above described characteristics, compilers that generate executable codes for processors optimize the number of execution cycles in total by rearranging instructions in a range where constraint of dependencies among instructions is satisfied. This is called instruction scheduling, and the ability of instruction scheduling significantly affects the performance of generated executable codes.

However, deriving optimally arranged instructions is a problem of Non-deterministic Polynomial time (NP) hard, and other optimization functions also affect the performance of executable codes. Thus, heuristic algorithms are adopted for an instruction scheduling function, and an algorithm that leads to a better result varies depending on a situation.

On the other hand, conventionally, as described in Patent Reference 1 (Japanese Patent No. 3311381) for example, there is an instruction scheduling method of (i) determining how registers are being used, (ii) selecting, based on the determination, one of an instruction scheduling method that gives priority to a parallelism and an instruction scheduling method that reduces the number of simultaneously active registers, and (iii) executing instruction scheduling conforming to the selected instruction scheduling method.

Alternatively, as described in Patent Reference 2 (Japanese Unexamined Patent Application Publication No. 2001-159983) for example, there is an instruction scheduling method of (i) referring to information of common sub-expression eliminated through a common sub-expression elimination that is one of the optimization methods, (ii) selecting, based on the information of whether or not the common sub-expression has been eliminated, an instruction scheduling method and (iii) executing instruction scheduling conforming to the selected instruction scheduling method.

SUMMARY OF THE INVENTION

The recent trend of processors shows that, regarding parallel processing of instructions, processors having a plurality of operation modes or processors which support multithread operations have become available.

The conventional methods allow a selection of an instruction scheduling method depending on the status of optimization of source program or intermediate codes within a single operation mode though, the conventional methods do not support switching between operation modes. In addition, with the conventional methods, it is not possible to switch operation modes along with a change in instruction level parallelism or a change in instruction latency that are caused by multithread operation. Further, programmers cannot control instruction scheduling methods.

Consequently, the conventional technologies have a problem of not being able to generate efficient executable codes, which are appropriate for a situation, for the processors available in recent years.

The present invention has been conceived to solve the above described problem, and has an object to provide a program converting apparatus and the like that makes it possible to (i) switch between operation modes, (ii) switch between operation modes along with multithread operations, or (iii) generate efficient executable codes which satisfy a request from a programmer.

In order to achieve the aforementioned object, a program converting apparatus according to an aspect of the present invention converts a source program written in a high-level language or in assembly language into a program written in machine language codes executable by a target processor. The program converting apparatus includes: a storage unit configured to store the source program; a programmer directive receiving unit configured to receive, from a programmer, a directive for specifying an instruction scheduling method; and an instruction scheduling unit configured to execute, conforming to one of a plurality of instruction scheduling methods, instruction scheduling of rearranging intermediate codes corresponding to the source program stored in the storage unit, wherein the instruction scheduling unit is configured to select one of the instruction scheduling methods according to the directive received by the programmer directive receiving unit, and to execute an instruction scheduling conforming to the selected instruction scheduling method.

With this, it becomes possible to generate machine language codes having high execution efficiency suitable for corresponding one of operation modes of a processor with a plurality of operation modes.

Preferably, the directive received by the programmer directive receiving unit is a directive regarding an operation mode of the target processor.

More preferably, the target processor is a Very Long Instruction Word (VLIW) processor, and the operation mode of the target processor is an operation mode of the VLIW processor.

When a target processor is a processor that can execute a group of instructions that are written conforming to a VLIW method (hereinafter referred to as a "VLIW processor"), it becomes possible to generate machine language codes which satisfy constraint of each of operation modes.

Preferably, the directive received by the programmer directive receiving unit is a directive regarding an instruction scheduling method.

A programmer can directly specify the instruction scheduling method, thus it becomes possible to execute fine performance tuning.

A program converting apparatus according to another aspect of the present invention converts a source program written in a high-level language or in assembly language into a program written in machine language codes executable by a target processor. The program converting apparatus includes: a storage unit configured to store the source program; an instruction scheduling unit configured to execute, conforming to each of a plurality of instruction scheduling methods, instruction scheduling of rearranging intermediate codes corresponding to the source program stored in the storage unit; and a code generating unit configured to convert, into a corresponding one of machine language codes, each of the intermediate codes on which instruction scheduling has been executed by the instruction scheduling unit conforming to the instruction scheduling methods.

With this, it becomes possible for a user to select machine language codes having high execution efficiency suitable for corresponding one of operation modes of a processor with a plurality of operation modes.

Preferably, the instruction scheduling method is set for each of operation modes of the target processor.

More preferably, the target processor is a VLIW processor, and the operation mode of the target processor is an operation mode of the VLIW processor.

When the target processor is the VLIW processor, it becomes possible for a user to select machine language codes which satisfy the constraint of each of operation modes.

Note that the present invention can be realized not only as a program converting apparatus that includes such characteristic processing units but also as a program conversion method which includes, as steps, such characteristic processing units included in the program converting apparatus. In addition, the present invention can also be realized as a program that causes a computer to function as the characteristic units included in the program converting apparatus. In addition, it goes without saying that such a program can be distributed through a recording medium such as a compact disc-read only memory (CD-ROM).

According to the present invention, by switching between instruction scheduling methods depending on an operation mode of hardware, it becomes possible to generate executable codes (machine language codes) having high execution efficiency that are suitable for an operation mode. When the target processor is the VLIW processor, it becomes possible to generate executable codes which satisfy the constraint of an operation mode. Furthermore, the present invention provides a programmer with means to give a directive for switching between instruction scheduling methods, and thus allows fine tuning of machine language codes to be generated.

FURTHER INFORMATION ABOUT TECHNICAL BACKGROUND TO THIS APPLICATION

The disclosure of Japanese Patent Application No. 2008-331632 filed on Dec. 25, 2008 including specification, drawings and claims is incorporated herein by reference in its entirety.

The disclosure of PCT application No. PCT/JP2009/005870 filed on Nov. 5, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a diagram showing a table which indicates correspondence between an instruction scheduling directive and an instruction scheduling setting.

DESCRIPTION OF THE PREFERRED EMBODIMENT(S)

Embodiment 1

The following will describe a compiler system according to Embodiment 1 of the present invention with reference to drawings.

Figure 1:
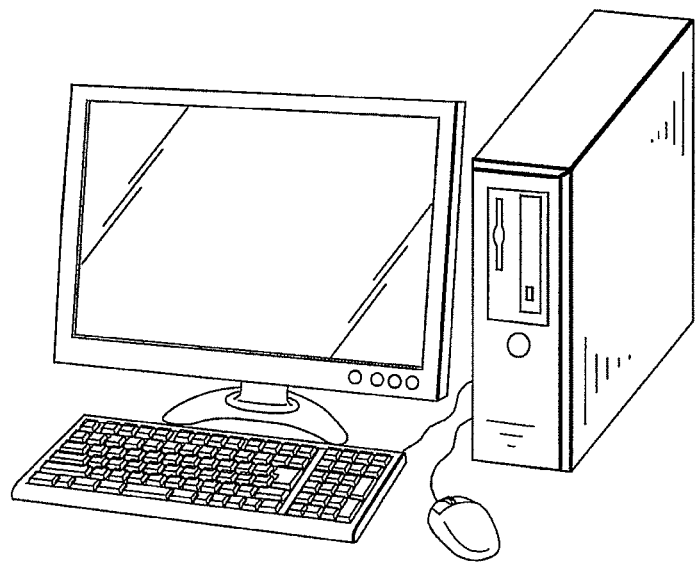
FIG. 1 is an external view of a computer on which compilers according to Embodiment 1 and 2 of the present invention are executed.

A compiler system is implemented by executing a below described compiler on a general computer such as a computer shown in FIG. 1 which includes a memory and a CPU.

Figure 2:
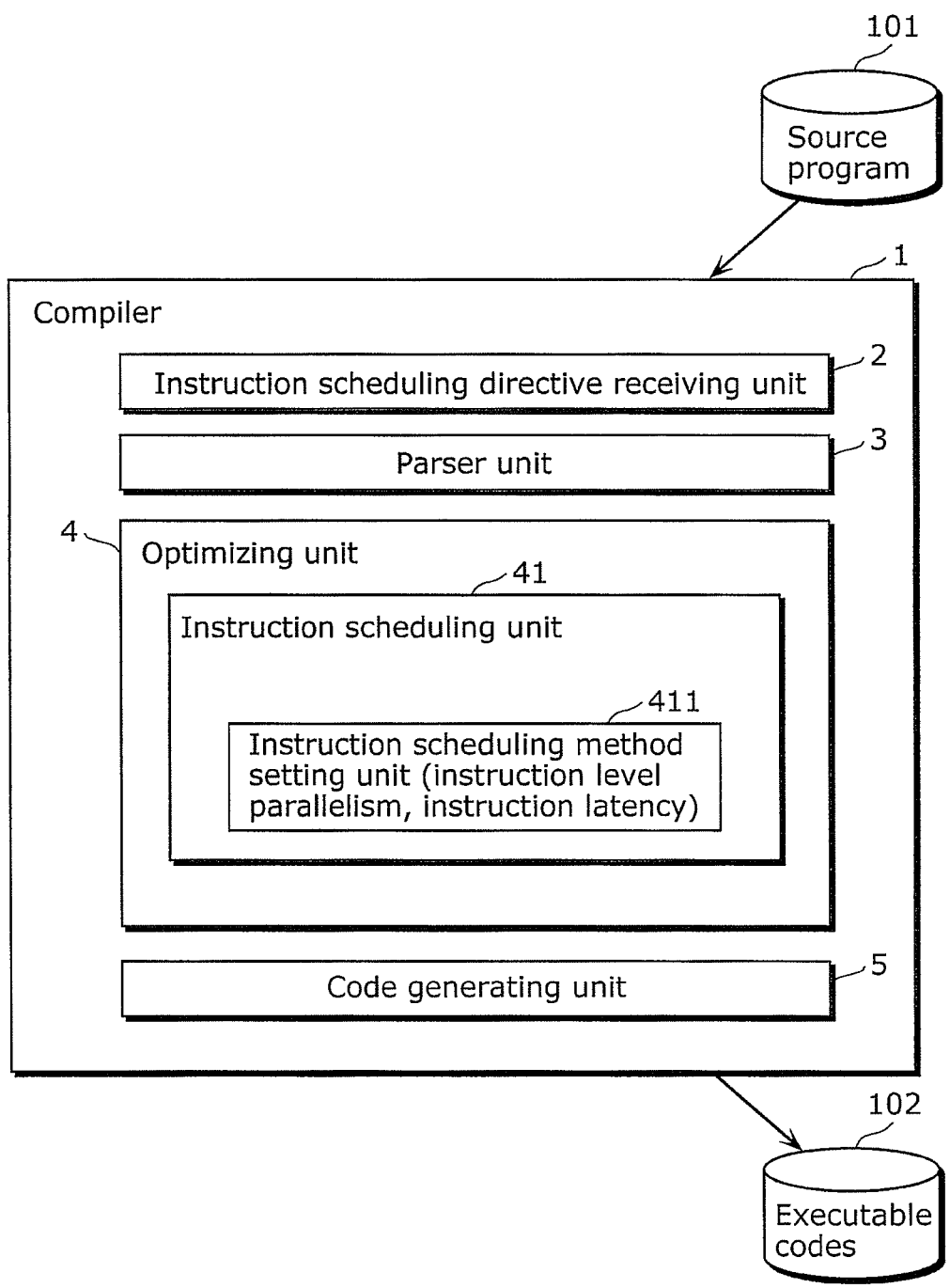
FIG. 2 is a block diagram showing a structure of the compiler according to Embodiment 1 of the present invention.

FIG. 2 is a block diagram showing a structure of compiler 1 according to Embodiment 1.

The compiler 1 receives an input of a source program 101 that is written in C language by the programmer, converts the source program 101 into intermediate codes, performs optimization and resource allocation on the intermediate codes, and then generates executable codes 102 for a target processor. The source program 101 and the executable codes 102 are stored in a memory or a hard disk included in a computer. Furthermore, intermediate data generated during the processing executed by the compiler is also stored in a memory or a hard disk included in a computer.

Following describes specification of a processor which is targeted by a complier according to the present invention.

The target processor is a superscalar processor which has an instruction parallelism mechanism for four instructions per cycle. Furthermore, the target processor has multithread execution mechanism for up to three threads. In order to allow three threads to be executed in parallel, the target processor has three sets of a program counter and a group of context registers. For multithread execution, four operation modes are available. The operation mode can be selected through a setting of an architecture register.

FIG. 3A to FIG. 3D are diagrams showing an overview of multithread operation modes of the target processor. Each row in FIG. 3A to FIG. 3D represents one cycle, a horizontal axis represents instruction level parallelism, and a vertical axis represents time-direction. Here, instruction level parallelism refers to the number of instructions that can be executed in parallel per thread executable within the same cycle.

Figure 3A:
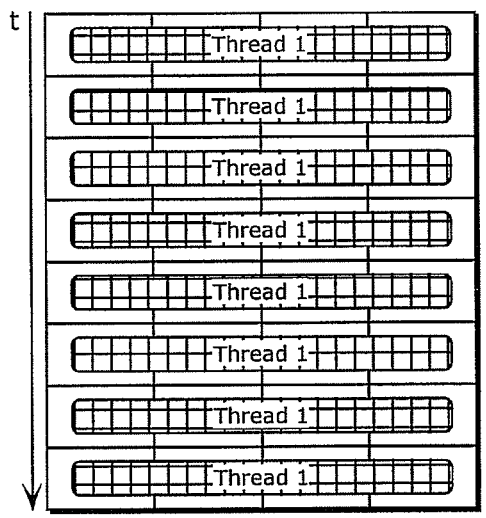
FIG. 3A is a diagram showing a multithread operation mode (mode 1) of a target processor.

FIG. 3A shows mode 1, that is, a single thread mode. In mode 1, only one thread is executed, and up to four instructions can be executed in parallel per cycle. In other words, one thread is executable within the same cycle.

Figure 3C:
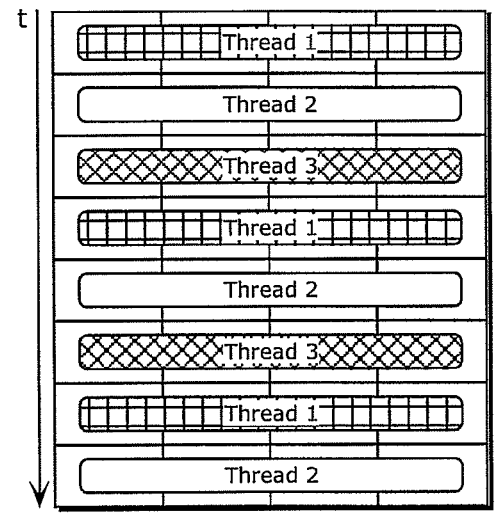
FIG. 3C is a diagram showing a multithread operation mode (mode 3) of the target processor.
Figure 3B:
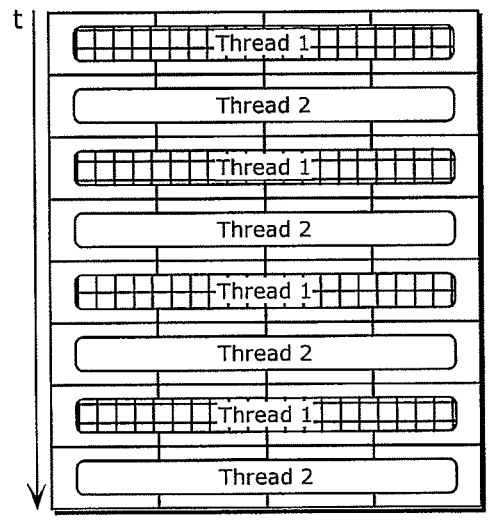
FIG. 3B is a diagram showing a multithread operation mode (mode 2) of the target processor.

FIG. 3B shows mode 2, that is, two threads execution mode by time-sharing. In mode 2, thread 1 and thread 2 operate alternately per cycle. Thus, from a view point of each thread, an execution cycle of self-thread comes once in every two cycles. Consequently, when focusing only on cycles in which self-thread is executed, the thread is executed as if latency of each instruction becomes one half compared to mode 1. In each cycle, up to four instructions can be executed in parallel. In other words, one thread is executable within the same cycle.

FIG. 3C shows mode 3, that is, three threads execution mode by time-sharing. In mode 3, thread 1, thread 2 and thread 3 are executed alternately in a round-robin manner. Thus, from a view point of each thread, execution cycle of self-thread comes once in every three cycles. Consequently, when focusing only on a cycle in which self-thread is executed, the thread is executed as if latency of each instruction becomes one third compared to mode 1. In each cycle, up to four instructions can be executed in parallel. In other words, one thread is executable within the same cycle.

Figure 3D:
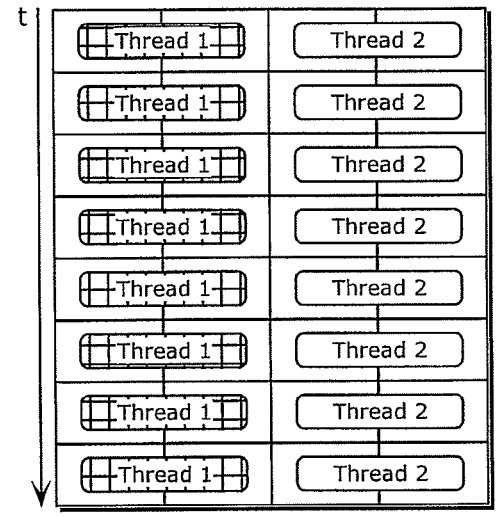
FIG. 3D is a diagram showing a multithread operation mode (mode 4) of the target processor.

FIG. 3D shows mode 4, that is, Simultaneous Multithreading (SMT) execution mode of two threads. In mode 4, each thread is executed every cycle in the same manner as the thread in mode 1 though, instruction level parallelism is constrained to two instructions per cycle. In other words, two threads are executable within the same cycle.

Following describes in detail a structure of each of components in compiler 1 according to the present invention and an operation thereof.

The compiler 1 is implemented by a program that is executed on a computer. The compiler 1 functionally includes (as processing units that function when executed on a computer): an instruction scheduling directive receiving unit 2, a parser unit 3, an optimizing unit 4, and a code generating unit 5.

Instruction scheduling directive receiving unit 2 receives, as a compiler option, a directive regarding instruction scheduling from a programmer. Specifically, the programmer who causes the compiler 1 to be executed inputs a multithread operation mode of the target processor as a compiler option in the following format.

-fhardware-thread-mode=NUM

In "NUM", one of the numbers 1 to 4 representing the number of multithread operation modes described with reference to FIG. 3A to FIG. 3D is specified. Through the specified number, the compiler 1 obtains information as to which multithread operation mode the code to be generated should conform to.

The parser unit 3 is a processing unit which performs, on the source program 101 that has been input to a compiler 1, extraction of a reserved word (keyword) or the like, lexical analysis, syntax analysis, and converts each of statements into one or more of intermediate codes according to a given rule.

The optimizing unit 4 performs, on the intermediate codes that have been output from the parser unit 3, optimization such as redundancy elimination, instruction scheduling, or register allocation.

The code generating unit 5 generates, from the intermediate codes that have been output from the optimizing unit 4, the executable codes 102 by converting all the codes into machine language codes with reference to a conversion table or the like that is held by the code generating unit 5.

The optimizing unit 4 includes an instruction scheduling unit 41 which rearranges machine language codes at an instruction level. The instruction scheduling unit 41 includes an instruction scheduling method setting unit 411 which sets a scheduling method of an instruction.

Figure 4:
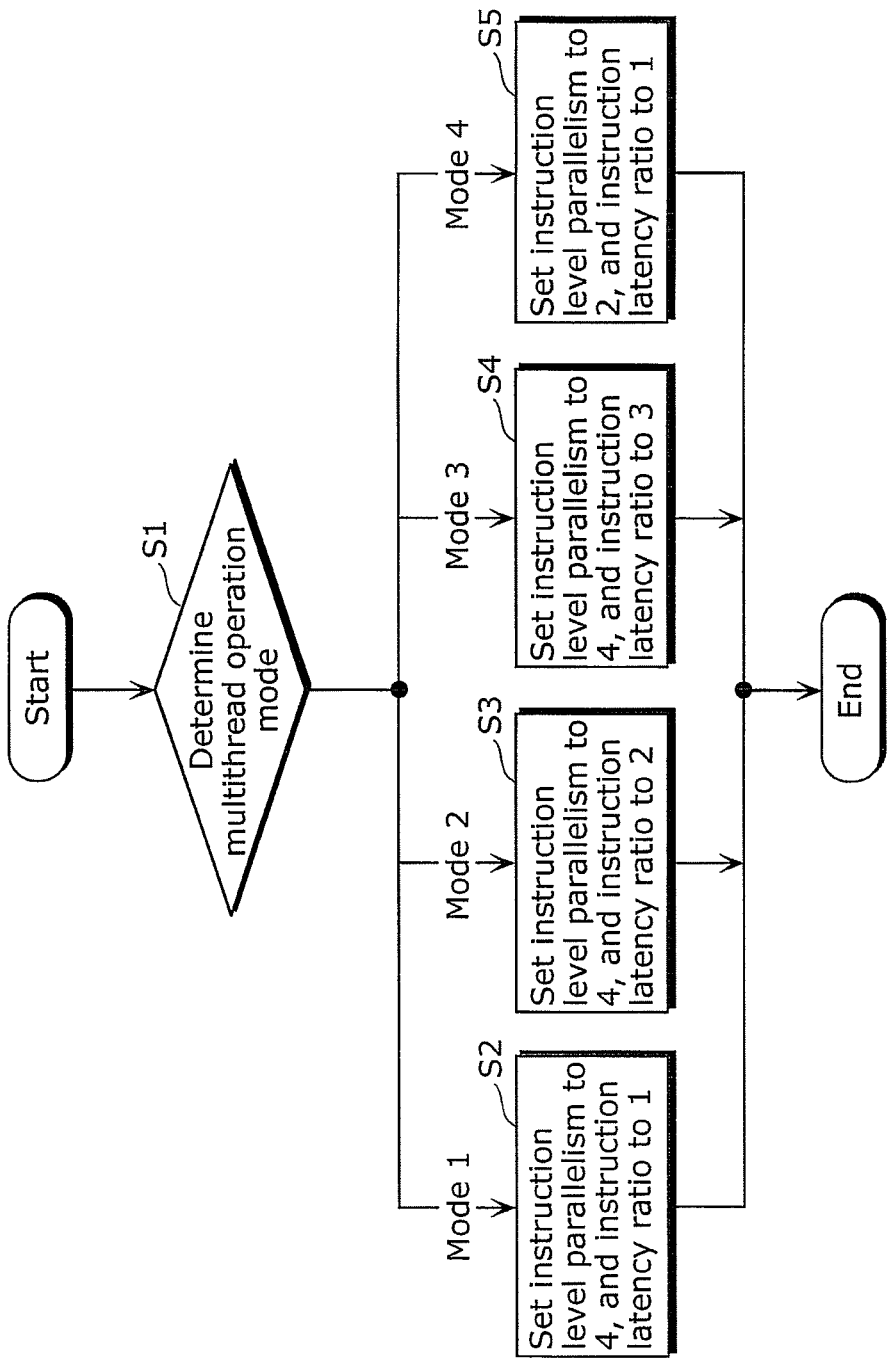
FIG. 4 is a flowchart illustrating processing performed by an instruction scheduling method setting unit 411.

FIG. 4 is a flowchart illustrating processing performed by the instruction scheduling method setting unit 411.

The instruction scheduling method setting unit 411 sets, conforming to the multithread operation mode that has been received by the instruction scheduling directive receiving unit 2, a parameter used for instruction scheduling.

Specifically, the instruction scheduling method setting unit 411 determines the multithread operation mode that has been received by the instruction scheduling directive receiving unit 2 (Step S1). When the determined mode is the mode 1 (mode 1 in Step S1), the instruction scheduling method setting unit 411 sets the instruction level parallelism to 4, and an instruction latency ratio to 1 (Step S2). The instruction latency ratio refers to the number of cycles taken from when a certain thread is executed to when the certain thread is executed next time. When the determined mode is the mode 2 (mode 2 in Step S1), the instruction scheduling method setting unit 411 sets the instruction level parallelism to 4, and the instruction latency ratio to 2 (Step S3). When the determined mode is the mode 3 (mode 3 in Step S1), the instruction scheduling method setting unit 411 sets the instruction level parallelism to 4, and the instruction latency ratio to 3 (Step S4). When the determined mode is the mode 4 (mode 4 in Step S1), the instruction scheduling method setting unit 411 sets the instruction level parallelism to 2, and the instruction latency ratio to 1 (Step S5). Setting regarding the instruction scheduling method is thus completed. Here, instruction latency ratio is an inverse number of a ratio of the instruction latency to instruction latency in the single thread mode.

In the instruction scheduling processing hereinafter performed by the instruction scheduling unit 41, the number of instructions arranged in each cycle is constrained according to the instruction level parallelism that has been set. In addition, the instruction scheduling unit 41 holds a table that indicates instruction latency in the single thread mode as reference instruction latency, and divides the value indicated in the table by the instruction latency ratio that has been set, and thus obtains a value to be used as latency of each of instructions. With this, the instruction scheduling unit 41 can perform instruction scheduling which satisfies a condition that has been set.

The compiler 1 thus structured makes it possible to switch to a suitable instruction scheduling method corresponding to the input of an operation mode of the target processor, and thus allows the generation of codes having high execution efficiency. In addition, the programmer can directly specify the instruction scheduling method for each of units of compiling, and thus allows fine performance tuning.

Embodiment 2

The following describes a compiler system according to Embodiment 2 of the present invention with reference to drawings. The difference between the compiler systems according to Embodiment 1 and Embodiment 2 is that, while the compiler system according to Embodiment 1 executes instruction scheduling conforming to the instruction scheduling method specified by a programmer, the compiler system according to Embodiment 2 executes instruction scheduling according to each of all the possible instruction scheduling methods.

The compiler system according to Embodiment 2 is implemented by executing a below described compiler on a general computer, such as the computer shown in FIG. 1 including a memory and a CPU, in the same manner as the compiler system according to Embodiment 1.

Figure 5:
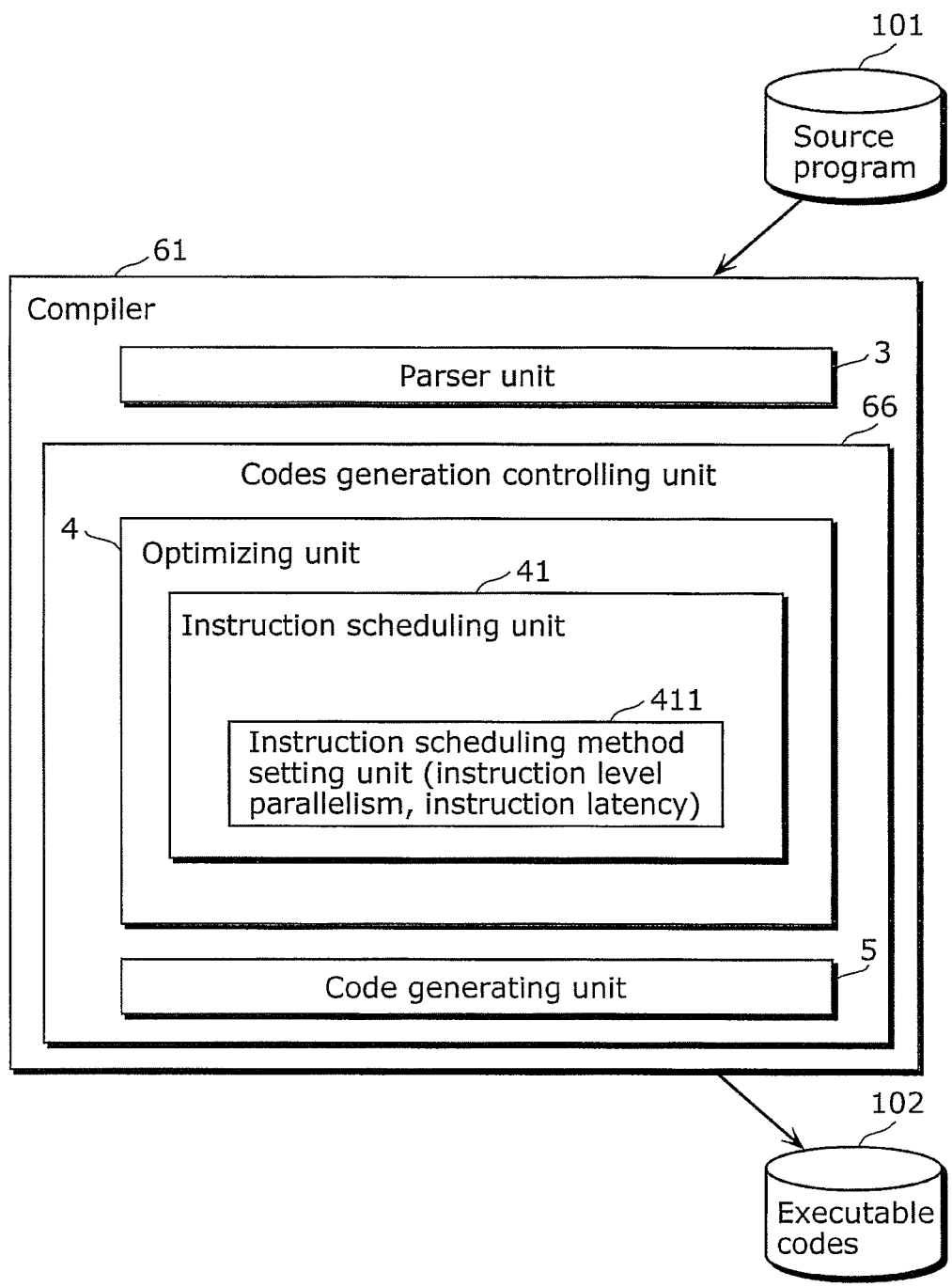
FIG. 5 is a block diagram showing a structure of a compiler according to Embodiment 2 of the present invention.

FIG. 5 is a block diagram showing a structure of a compiler 61 according to Embodiment 2 of the present invention.

The compiler 61 according to Embodiment 2 is mostly the same as the compiler 1 described in Embodiment 1 though, the instruction scheduling directive receiving unit 2 present in Embodiment 1 is absent. Furthermore, an optimizing unit 4, and a codes generation controlling unit 66, which controls the operation of the code generating unit 5, are added. Other components are the same as the compiler according to Embodiment 1. Also, the specification of the target processor is also the same. Thus, the detailed descriptions thereof are omitted here.

Following describes the operation of the codes generation controlling unit 66.

Figure 6:
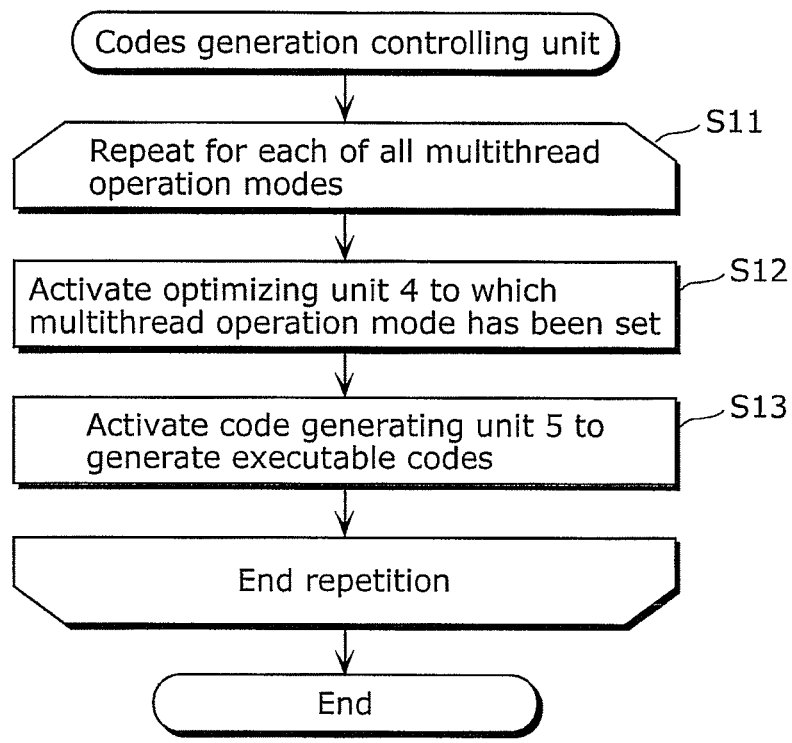
FIG. 6 is a flowchart illustrating processing performed by a codes generation controlling unit 66.

FIG. 6 is a flowchart illustrating processing performed by the codes generation controlling unit 66.

The codes generation controlling unit 66 repeats the below described processing for all the multithread operation modes of the target processor (Step S11). Specifically, below described processing is repeated four times for the mode 1 to the mode 4. Processing performed for each mode is as follows.

First, the codes generation controlling unit 66 activates the optimizing unit 4 to which a given multithread operation mode has already been set (Step S12). When the optimizing unit 4 is activated, setting of instruction level parallelism and instruction latency that correspond to the given multithread mode is made to the instruction scheduling method setting unit 411 in the optimizing unit 4. The instruction scheduling unit 41 executes the instruction scheduling that conforms to the instruction level parallelism and the instruction latency that has been set. Optimized intermediate codes are thus obtained.

The codes generation controlling unit 66 activates the code generating unit 5 (Step S13). When the code generating unit 5 is activated, the code generating unit 5 generates executable codes from the intermediate codes that are output by the optimizing unit 4. It is to be noted that the code generating unit 5 adds, to the end of a file name of executable codes, a numerical value that represents the multithread operation mode. Through the numerical value, it is possible to determine to which multithread operation mode the executable codes conform.

The codes generation controlling unit 66 repeats the above described processing (S12 and S13) for each of multithread operation modes.

The compiler 61 thus structured makes it possible to activate the optimizing unit and the code generating unit for each of all the multithread operation modes of the target processor, and generate executable codes each of which is suitable for a corresponding one of multithread operation modes. A programmer can select, from among the thus generated executable codes, suitable executable codes depending on a setting or usage of hardware in a program execution environment. Consequently, it is possible to increase efficiency in program execution.

The compiler system according to the present invention and the components thereof have been described according to Embodiment 1 and Embodiment 2 though, the present invention is not limited to those embodiments. In other words:

(1) In Embodiment 1 and Embodiment 2 described above, a compiler system for C language has been assumed though, a description language of a source program targeted by the present invention is not limited to C language. For example, the present invention holds significance even in the case where other programming language such as assembly language is adopted;

(2) In Embodiment 1 and Embodiment 2 described above, a compiler system for a high-level language has been assumed though, the present invention is not limited to this. For example, the present invention is applicable to an assembler optimizer or assembler instruction scheduler as well which receive an input of an assembler program;

(3) In Embodiment 1 and Embodiment 2 described above, a processor capable of issuing four instructions per cycle and simultaneously operating three threads in parallel has been assumed as the target processor though, the present invention is not limited to such numbers of simultaneously issued instructions and threads. Furthermore, as a variation of the numbers of simultaneously issued instructions and threads, the present invention is also applicable to a case where the instruction level parallelism is one and the number of thread is one;

(4) In Embodiment 1 and Embodiment 2 described above, a superscalar processor has been assumed as the target processor though, the present invention is not limited to this. The present invention is also applicable to a VLIW processor. In this case, in addition to the advantage of increasing efficiency in executing instructions in parallel, a further advantage is achieved. It becomes possible to generate instruction sequence which satisfies issuance constraint of each cycle corresponding to an operation mode of a VLIW processor;

(5) In Embodiment 1 described above, a compiler option has been assumed as a method to give directive to the instruction scheduling directive receiving unit though, the present invention is not limited to this instruction method. For example, a directive may be described, in a program, as #pragma directive or a pseudo-instruction. Alternatively, a compiler may present candidates of generation codes at the time of compiling to a programmer so that the programmer can select desired codes;

(6) In Embodiment 1 described above, as a content of directive given to the instruction scheduling directive receiving unit, a multithread operation mode of the target processor has been assumed though, the present invention is not limited to such a directive. For example, through a directive, an other operation mode of a processor may be specified. Also, through a directive, an instruction scheduling method may be directly specified instead of an operation mode of a processor. Furthermore, a value for setting an instruction scheduling method such as instruction level parallelism or instruction latency may be directly specified;

(7) In Embodiment 1 described above, it has been assumed that an instruction scheduling method is set by the instruction scheduling method setting unit according to a directive value specified by a programmer though, the present invention is not limited to this setting method. For example, a table such as a table shown in FIG. 7, in which a directive value (multithread operation mode) and a value for setting an instruction scheduling method (instruction level parallelism and instruction latency ratio) are associated with each other, may be held, and the instruction scheduling method may be set with reference to the table;

(8) In Embodiment 1 and Embodiment 2 described above, it has been assumed that a latency value used for instruction scheduling is obtained by dividing a latency value indicated in reference instruction latency table by a latency ratio that is set by the instruction scheduling method setting unit. However, the present invention is not limited to this. A latency value may be obtained through an other method. For example, instruction latency tables for each of the multithread operation modes of a processor may be held, and a latency value may be obtained with reference to a table that corresponds to an operation mode;

(9) In Embodiment 2 described above, it has been assumed that the codes generation controlling unit repeats processing for all the multithread operation modes of a processor though, the present invention is not limited to this. Processing may be repeated for a variation of an other operation mode of a processor. Alternatively, processing may be repeated for a variation of a parameter or an algorithm of an instruction scheduling pre-defined by a compiler;

(10) In Embodiment 2 described above, it has been assumed that a multithread operation mode number is added to the end of a file name when codes are generated by the codes generation controlling unit though, the present invention is not limited to this file naming method. For example, file name may be preceded by a multithread operation mode number. Alternatively, a predetermined character string or a random number that is generated within a compiler may be added;

(11) In Embodiment 2 described above, it has been assumed that the codes generation controlling unit generates executable codes for multithread operation modes though, the present invention is not limited to this output method of the executable codes. Executable codes for each of operation modes may be combined into one file and output so that executable codes to be executed may be selected in an execution environment; and

(12) Each of the embodiments and variations described above may be used in combination.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to a compiler system and the like which converts a source program written in a high-level language such as C language to a machine language program supported by a target processor.

What is claimed is:

1. A program converting apparatus which converts a source program written in a high-level language or in assembly language into a program written in machine language codes executable by a target processor, said program converting apparatus comprising:
a memory configured to store the source program;
a programmer directive receiving unit configured to receive, from a programmer who writes source programs, a directive for specifying an instruction scheduling method; and
an instruction scheduling unit configured to execute, conforming to one of a plurality of instruction scheduling methods, instruction scheduling of rearranging intermediate codes corresponding to the source program stored in said memory,
wherein said instruction scheduling unit is configured to select one of the instruction scheduling methods according to the directive received by said programmer directive receiving unit, and to execute an instruction scheduling conforming to the selected instruction scheduling method,
the directive received by said programmer directive receiving unit is a directive regarding an operation mode of the target processor;
wherein the target processor is a processor which has a multithread execution mechanism, and the operation mode of the target processor is an operation mode regarding a multithread operation;
wherein the operation mode regarding the multithread operation specifies the number of threads executed by time-sharing or the number of threads executed within the same cycle; and
wherein the directive regarding the instruction scheduling method is information regarding instruction latency or an instruction latency ratio, the instruction latency being the number of cycles required for the target processor to execute one instruction, and the instruction latency ratio being an inverse number of a ratio of the instruction latency to instruction latency in a single thread mode.

2. The program converting apparatus according to claim 1, wherein the target processor is a Very Long Instruction Word (VLIW) processor, and the operation mode of the target processor is an operation mode of the VLIW processor.

3. The program converting apparatus according to claim 1, wherein the target processor is a processor which has a multithread execution mechanism, and the directive regarding the instruction scheduling method is a directive regarding instruction level parallelism that indicates the number of instructions that the target processor can execute in parallel per thread executable within the same cycle.

4. A program conversion method for converting, using a computer, a source program written in a high-level language or in assembly language into a program written in machine language codes executable by a target processor, said program conversion method comprising steps of:
receiving, from a programmer who writes source programs, a directive for specifying an instruction scheduling method; and
executing, conforming to one of a plurality of instruction scheduling methods, instruction scheduling of rearranging intermediate codes corresponding to the source program,
wherein in said step of executing, one of the scheduling methods is selected according to the directive received in said step of receiving, and instruction scheduling is executed conforming to the selected instruction scheduling method and
the directive received from said programmer is a directive regarding an operation mode of the target processor;
wherein the target processor is a processor which has a multithread execution mechanism, and the operation mode of the target processor is an operation mode regarding a multithread operation;
wherein the operation mode regarding the multithread operation specifies the number of threads executed by time-sharing or the number of threads executed within the same cycle; and
wherein the directive regarding the instruction scheduling method is information regarding instruction latency or an instruction latency ratio, the instruction latency being the number of cycles required for the target processor to execute one instruction, and the instruction latency ratio being an inverse number of a ratio of the instruction latency to instruction latency in a single thread mode.

5. A non-transitory computer-readable recording medium, the recording medium having a computer program recorded thereon for causing a computer to execute the steps of the program conversion method according to claim 4.

* * * * *